(12) United States Patent
Sha et al.

(10) Patent No.: US 12,513,605 B2
(45) Date of Patent: Dec. 30, 2025

(54) METHODS, APPARATUS AND SYSTEMS FOR CONFIGURING MICRO SERVICE AREAS IN A WIRELESS COMMUNICATION

(71) Applicant: ZTE Corporation, Guangdong (CN)

(72) Inventors: Xiubin Sha, Guangdong (CN); Bo Dai, Guangdong (CN); Ting Lu, Guangdong (CN); Jianxun Ai, Guangdong (CN); Xu Liu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 213 days.

(21) Appl. No.: 17/857,586

(22) Filed: Jul. 5, 2022

(65) Prior Publication Data

US 2022/0338108 A1 Oct. 20, 2022

Related U.S. Application Data

(63) Continuation of application No. PCT/CN2020/070232, filed on Jan. 3, 2020.

(51) Int. Cl.
*H04W 48/16* (2009.01)
*H04W 64/00* (2009.01)

(52) U.S. Cl.
CPC ......... *H04W 48/16* (2013.01); *H04W 64/006* (2013.01)

(58) Field of Classification Search
CPC ... H04W 48/16; H04W 64/006; H04W 48/06; H04W 24/08; H04W 48/04; H04W 24/02; H04W 48/02; H04W 52/146; H04W 56/00; H04W 68/00; Y02D 30/70
See application file for complete search history.

(56) References Cited

U.S. PATENT DOCUMENTS

| | | | |
|---|---|---|---|
| 9,813,965 B1 | 11/2017 | Edara et al. | |
| 2007/0213067 A1* | 9/2007 | Li | H04W 24/02 455/444 |
| 2011/0190000 A1* | 8/2011 | Kwun | H04W 24/02 455/450 |

(Continued)

FOREIGN PATENT DOCUMENTS

| | | |
|---|---|---|
| CN | 101904206 A | 12/2010 |
| CN | 105122914 A | 12/2015 |

(Continued)

OTHER PUBLICATIONS

Second Office Action issued for CHina Patent Application No. 202080084228.7 mailed Mar. 27, 2024, with English translation (19 pages).

(Continued)

*Primary Examiner* — Brandon J Miller
(74) *Attorney, Agent, or Firm* — Crowell & Moring LLP

(57) ABSTRACT

Methods, apparatus and systems for configuring micro service areas in a wireless communication are disclosed. In one embodiment, a method performed by a wireless communication device is disclosed. The method comprises: receiving, from a wireless communication node, micro service areas related information related to a plurality of micro service areas of a cell; and determining, from the plurality of micro service areas, a micro service area associated with the wireless communication device.

20 Claims, 14 Drawing Sheets

(56) References Cited

U.S. PATENT DOCUMENTS

| | | | |
|---|---|---|---|
| 2011/0190010 A1* | 8/2011 | Cho .................... | H04W 60/04 |
| | | | 455/458 |
| 2012/0020209 A1 | 1/2012 | Ghosh et al. | |
| 2014/0302880 A1 | 10/2014 | Godin et al. | |
| 2015/0049649 A1* | 2/2015 | Zhu .................... | H04W 52/287 |
| | | | 370/329 |
| 2016/0249390 A1* | 8/2016 | Hans .................... | H04W 76/10 |
| 2017/0273052 A1 | 9/2017 | Liu et al. | |
| 2017/0311217 A1 | 10/2017 | Jung et al. | |
| 2018/0146231 A1 | 5/2018 | Saeedasr et al. | |
| 2018/0270719 A1* | 9/2018 | Chai .................... | H04W 36/04 |
| 2019/0394749 A1* | 12/2019 | Islam .................... | H04W 80/02 |
| 2020/0100172 A1 | 3/2020 | Wang et al. | |

FOREIGN PATENT DOCUMENTS

| | | |
|---|---|---|
| CN | 105992229 A | 10/2016 |
| CN | 106792783 A | 5/2017 |
| CN | 107005932 A | 8/2017 |
| CN | 107925891 A | 4/2018 |
| CN | 109937609 A | 6/2019 |
| EP | 2 586 251 B1 | 2/2018 |
| GB | 2500260 A | 9/2013 |
| JP | 2003-274435 A | 9/2003 |
| JP | 2005039368 A | 2/2005 |
| WO | WO 2009/140647 A2 | 11/2009 |
| WO | WO 2019/032853 A1 | 2/2019 |

OTHER PUBLICATIONS

Extended European Search Report received for Application No. EP 20 886 511.3 mailed Dec. 22, 2022 (10 pages).

First Office Action issued for China Patent Application No. 202080084228.7 mailed Sep. 6, 2023 (17 pages).

International Search Report and Written Opinion received for Application No. PCT/CN2020/070232 mailed Sep. 24, 2020 (6 pages).

Third Office Action issued for China Patent Application No. 202080084228.7 mailed Jul. 19, 2024, with English translation (20 pages).

Panasonic: "Proposal of Subcell", 3GPP TSG RAN WG1 Meeting #87, Reno, Nevada; R1-1612228, Nov. 14-18, 2016 (3 pp.).

Notice of Allowance issued for China Patent Application No. 202080057228.7 dispatched Sep. 29, 2024, with English translation (8 pp.).

NTT Docomo, Inc., RP-170376 "Status Report of Study on New Radio Access Technology," 3 GPP SG RAN meeting #75, 3GPP tsg_ran\TSG_RAN,TSGR_75, Feb. 28, 2017, Dubrovnik, Croatia, Mar. 6-9, 2017 (157 pp.) [uploaded to Patent Center in two separate sections].

Wang et al., Mobile Communications, "4G Wireless Network Refined Planning Ideas and Strategies," May 15, 2016 (with English translation) (11 pp.).

Communication for EP Patent Application No. 20 886 511.3 dated Jun. 16, 2025 (7 pp.).

Office Action issued for the Indonesia Patent Application No. P00202208180 dated Aug. 14, 2025 (6 pp.).

Korean-language Office Action and English summary of Office Action issued in Korean Application No. 10-2022-7026187 dated Oct. 23, 2025, (10 pages).

Jerry Carpenter, "5G New Radio Mobile Network Testing," MNT Seminar, Lisbon (Jun. 7, 2019), 40 pages.

R-4-1809601, RAN#87 Meeting report, 3GPP TSG RAN WG4 #88, published at 3GPP server on Aug. 17, 2018, 933 pages.

\* cited by examiner

| | RSRP >= X0 | X1 <= RSRP < X0 | RSRP < X1 |
|---|---|---|---|
| SSB#0 | MC0 | MC1 | MC2 |
| SSB#1 | MC3 | MC4 | MC5 |
| SSB#2 | MC6 | MC7 | MC8 |

FIG. 7

| | RSRP >= X0 | X1 <= RSRP < X0 | X2 <= RSRP < X1 | RSRP < X2 |
|---|---|---|---|---|
| SSB#0 | TA0 | TA1 | TA6 | TA7 |
| SSB#1 | TA2 | TA3 | TA8 | TA9 |
| SSB#2 | TA4 | TA5 | TA10 | TA11 |

| | RSRP >= X0 | X1 <= RSRP < X0 | X2 <= RSRP < X1 | RSRP < X2 |
|---|---|---|---|---|
| SSBF0 | Tx0(No Nbr Meas) | Tx1(Less Nbr Meas) | Tx6(Full Nbr Meas) | Tx7(Full Nbr Meas) |
| SSBF1 | Tx2(No Nbr Meas) | Tx3(Less Nbr Meas) | Tx8(Full Nbr Meas) | Tx9(Full Nbr Meas) |
| SSBF2 | Tx4(No Nbr Meas) | Tx5(Less Nbr Meas) | Tx10(Full Nbr Meas) | Tx11(Full Nbr Meas) |

METHODS, APPARATUS AND SYSTEMS FOR CONFIGURING MICRO SERVICE AREAS IN A WIRELESS COMMUNICATION

PRIORITY

This application claims priority as a Continuation of PCT/CN2020/070232, filed on Jan. 3, 2020, entitled "METHODS, APPARATUS AND SYSTEMS FOR CONFIGURING MICRO SERVICE AREAS IN A WIRELESS COMMUNICATION", published as WO 2021/093141 A1, the entirety of which is incorporated herein by reference.

TECHNICAL FIELD

The disclosure relates generally to wireless communications and, more particularly, to methods, apparatus and systems for configuring micro service areas in a wireless communication.

BACKGROUND

In a wireless communication following a current standard, e.g. in a fifth-generation (5G) new radio (NR) system, radio resource management is divided in units of cells, which makes it impossible to implement fined management of cell resources. For example, when there is severe interference in one direction of the cell, there is no way to reduce the number of user accesses in that direction in an existing system.

In another example, when a UE located at an edge of a cell wants to access the cell, the cell load will be greatly impacted. But in an existing system, it is impossible to reduce the number of user accesses at the cell edge, even when the cell load is high. In yet another example, it is less likely for a user equipment (UE) located at a center of a cell to have a handover, which lowers a requirement of a mobility measurement for this kind of UE. But in an existing system, it is also difficult or impossible for this kind of UE to reduce the neighboring cell measurements for saving the power consumption of the UE.

Thus, existing systems and methods for radio resource management in a wireless communication are not entirely satisfactory.

SUMMARY

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication device is disclosed. The method comprises: receiving, from a wireless communication node, micro service areas related information related to a plurality of micro service areas of a cell; and determining, from the plurality of micro service areas, a micro service area associated with the wireless communication device.

In another embodiment, a method performed by a wireless communication node is disclosed. The method comprises: transmitting micro service areas related information to a wireless communication device. The wireless communication node is associated with a cell covering a plurality of micro service areas. A micro service area associated with the wireless communication device is determined from the plurality of micro service areas.

In a different embodiment, a wireless communication node configured to carry out a disclosed method in some embodiment is disclosed. In yet another embodiment, a wireless communication device configured to carry out a disclosed method in some embodiment is disclosed. In still another embodiment, a non-transitory computer-readable medium having stored thereon computer-executable instructions for carrying out a disclosed method in some embodiment is disclosed. The above and other aspects and their implementations are described in greater detail in the drawings, the descriptions, and the claims.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

FIG. 7 illustrates an exemplary table listing the micro service areas divided based on the method shown in FIG. 6, in accordance with some embodiments of the present disclosure.

FIG. 12 illustrates an exemplary table listing different timing advance (TA) values in different micro service areas, in accordance with some embodiments of the present disclosure.

FIG. 14 illustrates an exemplary table listing different uplink initial transmit powers in different micro service areas, in accordance with some embodiments of the present disclosure.

DETAILED DESCRIPTION OF EXEMPLARY EMBODIMENTS

Figure 1:
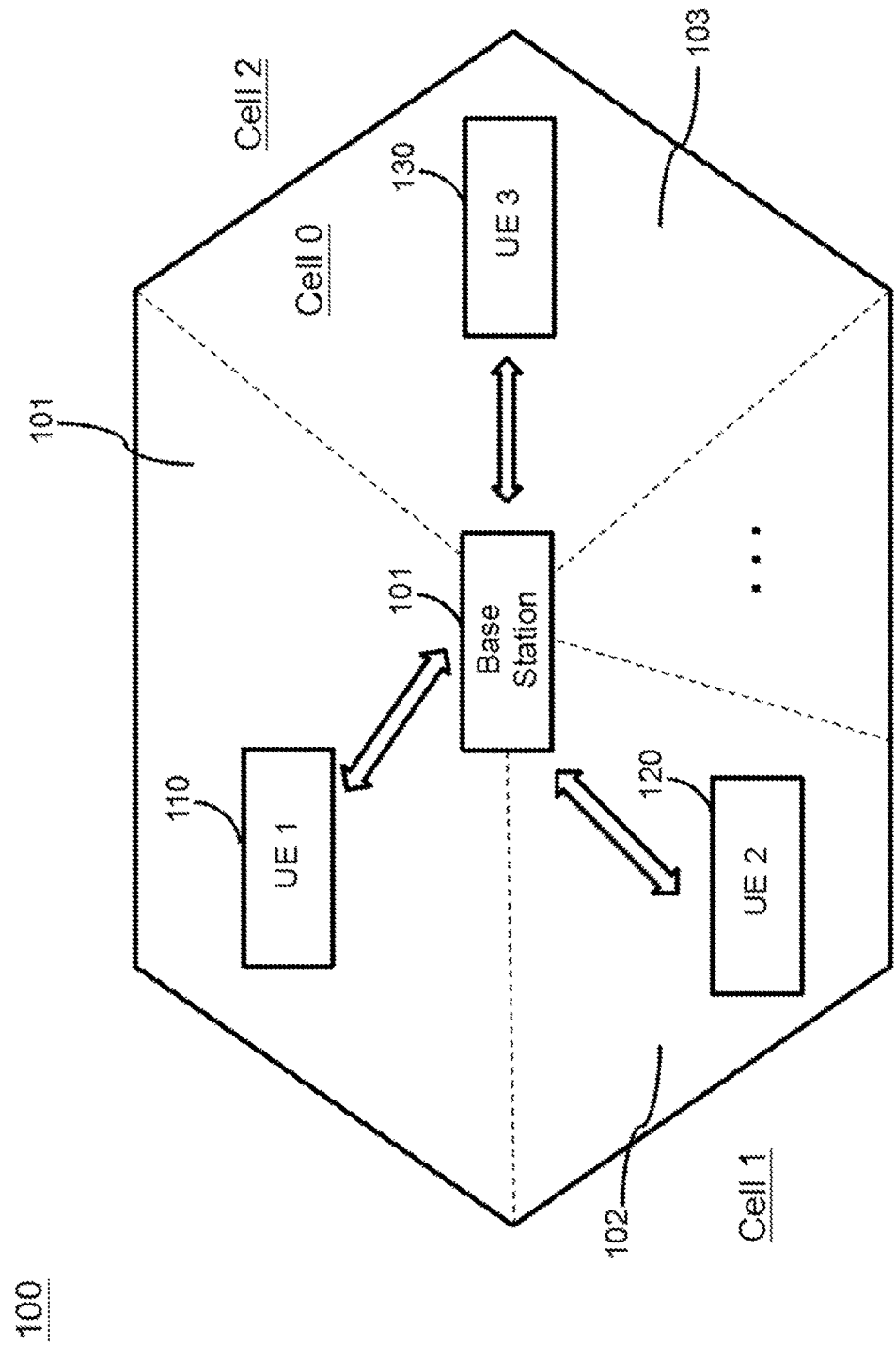
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. The radio coverage area is called a cell, where a wireless network may be distributed over multiple cells. The present teaching provides methods and systems for dividing a cell into several micro service areas, to achieve accurate management of wireless resources.

In various embodiments, a cell is divided into several micro service areas based on one or more predetermined rules. The predetermined rules are based on at least one of the following factors: a RSRP measurement value, a BF coverage area or a synchronization signal block (SSB) beam index, a neighbor cell identity (ID), a UAC category, an access class and a service type. For example, a cell is divided into several grids, using BF coverage as the longitude and RSRP intensity as the latitude. Each grid is configured as a "micro service area" or "micro service area" to perform accurate radio resource management in the cell. Throughout the present disclosure, the terms "micro service area," "micro service area," and "micro cell" may be used interchangeably.

In one embodiment, at a granularity of the micro service area, access control parameters may be configured. The access control parameters may be parameters related to unified access control (UAC), access barring (AB) or extended access barring (EAB). In other embodiments, using a micro service area as a granularity, adaptive uplink synchronization may be performed, an uplink initial transmission power can be determined, and neighbor cell related parameters can be configured and/or measured.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a core network, a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a Cell 0 and its neighbor cells, Cell 1 and Cell 2. Cell 0 includes a base station (BS) 101 and a plurality of UEs, UE 1 110, UE 2 120 . . . UE 3 130, where the BS 101 can communicate with the UEs according to wireless protocols within the Cell 0. To perform a better radio resource management within Cell 0, as shown in FIG. 1, Cell 0 is divided into multiple micro service areas 101, 102, 103. For example, the UE 1 110 is located in micro service area 101; the UE 2 120 is located in micro service area 102; and the UE 3 130 is located in micro service area 103.

Figure 2:
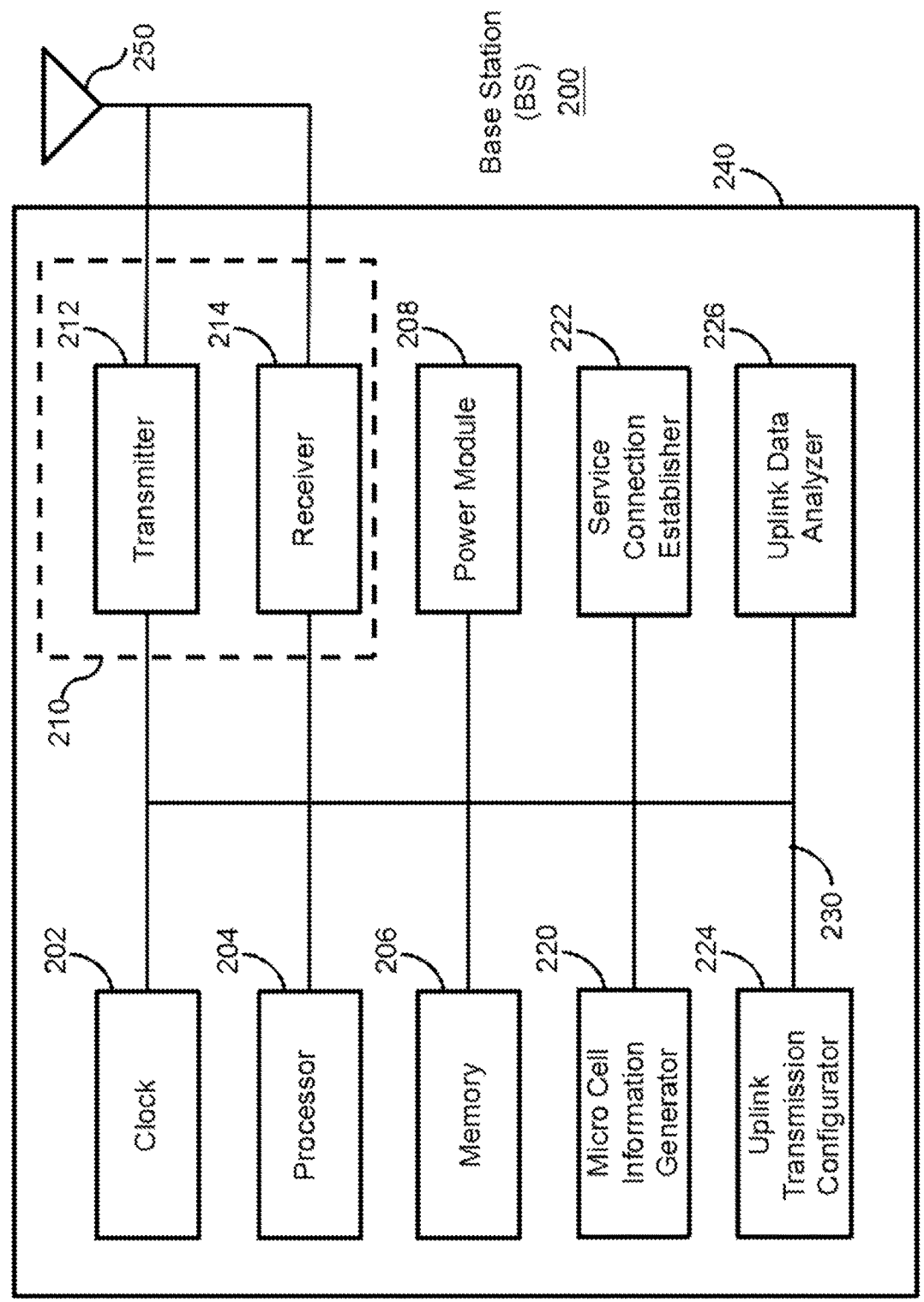
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a micro cell information generator 220, a service connection establisher 222, an uplink transmission configurator 224, and an uplink data analyzer 226.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 is associated with at least one cell. In one embodiment, the micro cell information generator 220 in the BS 200 may generate micro service areas related information. Each of the at least one cell is divided into a plurality of micro service areas based on the micro service areas related information. The micro cell information generator 220 may transmit, via the transmitter 212, the micro service areas related information to a UE in a current cell associated with the BS 200. The micro service areas related information may be utilized by the UE to perform at least one measurement related to micro service areas, and to determine a micro service area associated with the UE from the plurality of micro service areas based on the at least one measurement.

In one embodiment, based on the micro service area associated with the UE, the UE can determine at least one of the following: whether an access to the BS 200 is allowed; a range of neighbor cells of the current cell to be measured; a timing advance (TA) value used by the UE; and a reference value of an uplink transmit power for the UE. In one example, the at least one measurement is performed by: detecting a synchronization signal block (SSB) beam; and determining a beam index of the SSB. The micro service area is determined based on the beam index. In another example, the at least one measurement is performed by: measuring a reference signal received power (RSRP); and determining a range of the RSRP from a plurality of predetermined RSRP ranges. The micro service area is determined based on the range of the RSRP.

In another embodiment, the at least one measurement is performed by: performing a plurality of measurements with respect to a plurality of access control factors. The micro service area is determined based on the plurality of access control factors. According to various embodiments, the plurality of access control factors are related to one or more of: a SSB beam detected by the UE; a range of a RSRP measured by the UE; a service type of the UE; a unified access control (UAC) type of the UE; a height information of the UE; a distance between the UE and BS s in neighbor cells; identifications of the neighboring cells; network slices; measurement results of other access control factors in at least one of the neighboring cells; and a physical location area of the UE determined by the UE based on a positioning strategy. The service type includes at least one of: a reduced capability NR device, normal BR device. The reduced capability NR device may be: a NR UE with a reduced number of transmit and receiving antennas, a UE with bandwidth reduction, a UE with half-duplex frequency division duplex (FDD), a UE with relaxed UE processing time, or a UE with relaxed UE processing capability. In one embodiment, the information related to TAC characteristics of the UE is utilized to estimate information related to a range for paging associated with the UE. When the plurality of access control factors includes both service type based access control and UAC type based access control, the BS may perform at least one of the following: setting UAC parameters for the reduced capability NR device and UAC parameters for normal NR device independently; setting the same set of UAC parameters for the reduced capability NR device and normal NR device, and setting an indicator of whether the reduced capability NR device is barred or whether the reduced capability NR device uses the UAC strategy.

The service connection establisher 222 in this example may establish a service connection with the UE when an access to the BS 200 is allowed in the micro service area. Whether the access to the BS 200 is allowed in the micro service area is determined based on the micro service areas related information, where the micro service areas related information comprises access control information associated with each micro service area of the BS 200.

In one example, the service connection establisher 222 may establish a service connection with the UE only when an access to the BS 200 is allowed in the micro service area with respect to each of the plurality of access control factors. In this case, whether the access to the BS 200 is allowed or barred in the micro service area with respect to each of the plurality of access control factors is determined based on the micro service areas related information.

In another example, the service connection establisher 222 may establish a service connection with the UE when an access to the BS 200 is allowed in the micro service area with respect to any of the plurality of access control factors. In this case, whether the access to the BS 200 is allowed or barred in the micro service area with respect to any of the plurality of access control factors is determined based on the micro service areas related information.

The uplink transmission configurator 224 in this example may generate a configuration related to uplink transmissions of the UE. The uplink transmission configurator 224 can transmit, via the transmitter 212, the configuration to the UE. The uplink transmission configurator 224 may also send the configuration to the uplink data analyzer 226 for receiving uplink data from the UE.

The uplink data analyzer 226 in this example may receive, via the receiver 214, an uplink transmission from the UE. In one embodiment, the uplink transmission is transmitted based on a timing advance (TA) for uplink synchronization of the UE. The TA is determined based on the micro service area associated with the UE according to a configuration, wherein the configuration is determined based on a signal transmitted from the uplink transmission configurator 224, based on a movement path of the UE, or based on historical TA values on the movement path of the UE.

In another embodiment, the uplink transmission is transmitted with an initial uplink transmit power. The initial uplink transmit power is determined based at least partially on a reference value of an uplink transmit power for the UE. The reference value of the uplink transmit power is determined based on the micro service area associated with the UE according to a configuration, wherein the configuration is determined based on a signal transmitted from the uplink transmission configurator 224 or based on historical reference values of uplink transmit powers and movement track of the UE.

In one embodiment, the UE can determine whether to perform a neighbor cell measurement based on the micro service area associated with the UE according to a configuration, wherein the configuration is determined based on a signal transmitted by the BS or based on a moving history of the UE. For example, the UE can determine a moving speed of the UE. When the moving speed is lower than or equal to a predetermined threshold and the UE is in the center of the serving cell, no neighbor cell of the cell is measured; and when the moving speed is higher than the predetermined threshold or the UE is at the edge of the serving cell, at least one neighbor cell of the cell is measured. According to various embodiments, the moving speed of the UE may be determined based on one or more of: whether there is a change of the micro service area associated with the UE; and a changing speed of the micro service area associated with the UE.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the micro cell information generator 220. Conversely, each of the modules illustrated in FIG. 2 can be implemented using a plurality of separate components or elements.

Figure 3:
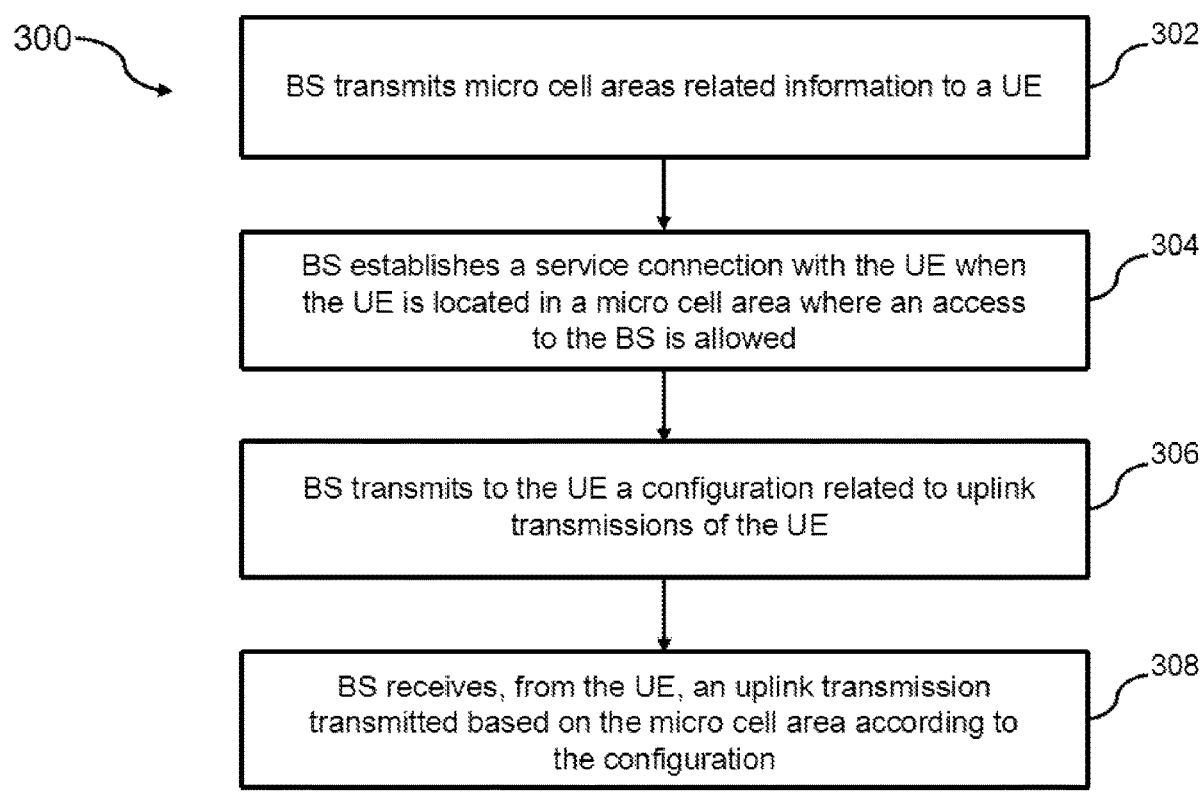
FIG. 3 illustrates a flow chart of a method performed by a BS for configuring micro service areas, in accordance with some embodiments of the present disclosure.

FIG. 3 illustrates a flow chart for a method 300 performed by a BS, e.g. the BS 200 in FIG. 2, for configuring micro service areas, in accordance with some embodiments of the present disclosure. At operation 302, the BS transmits micro service areas related information to a UE. At operation 304, the BS establishes a service connection with the UE when the UE is located in a micro service area where an access to the BS is allowed. At operation 306, the BS transmits to the UE a configuration related to uplink transmissions of the UE. At operation 308, the BS receives, from the UE, an uplink transmission transmitted based on the micro service area according to the configuration. The order of the steps shown in FIG. 3 may be changed according to different embodiments of the present disclosure.

Figure 4:
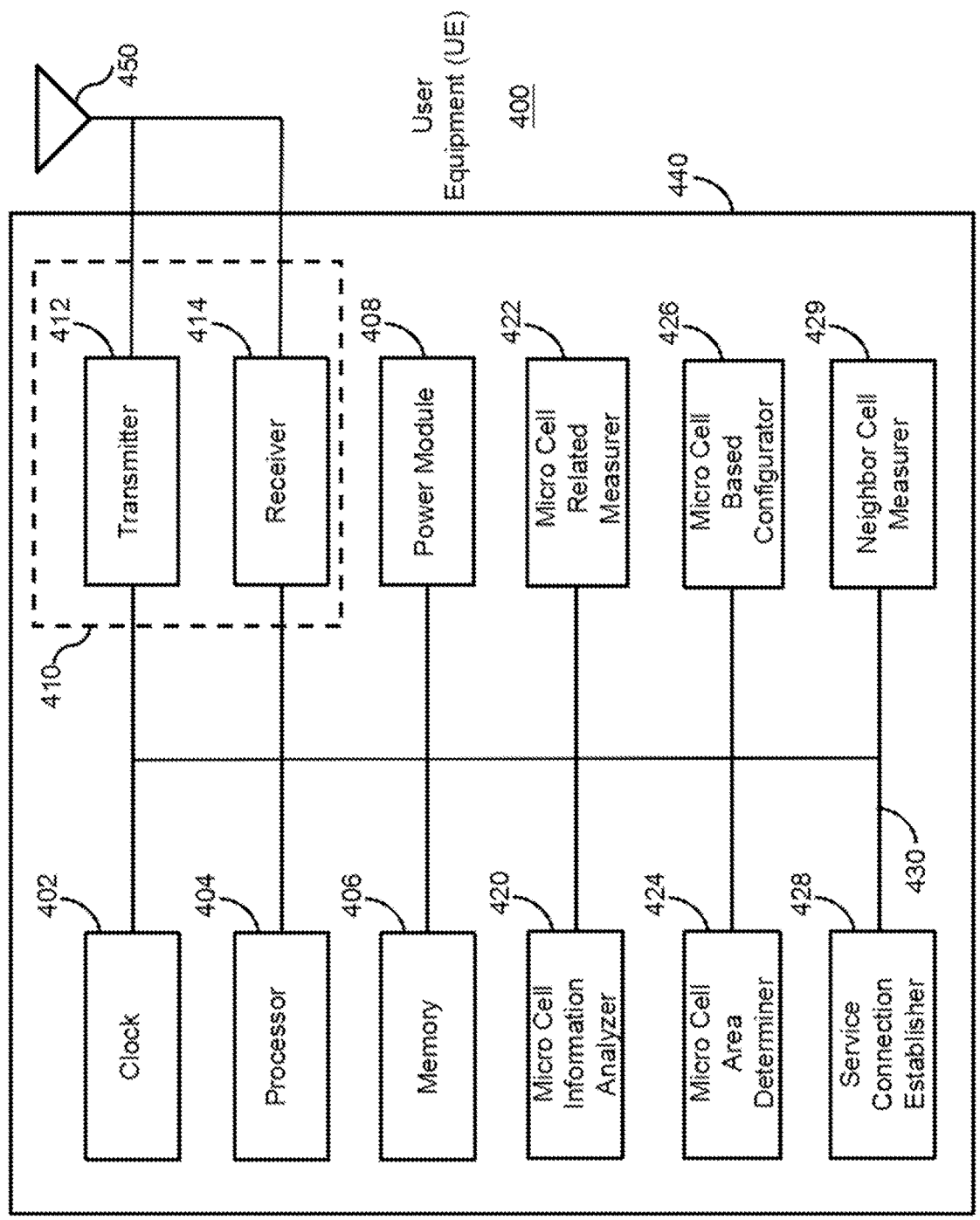
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a micro cell information analyzer 420, a micro cell related measurer 422, a micro service area determiner 424, a micro cell based configurator 426, a service connection establisher 428, and a neighbor cell measurer 429.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The micro cell information analyzer 420 in this example may receive, via the receiver 414 from a BS, micro service areas related information. In one embodiment, the BS is associated with at least one cell. Each of the at least one cell is divided into a plurality of micro service areas based on the micro service areas related information. The micro cell information analyzer 420 may analyze the micro service areas related information and send it to the micro cell related measurer 422, the micro service area determiner 424, and the micro cell based configurator 426.

The micro cell related measurer 422 in this example may perform at least one measurement related to micro service areas based on the micro service areas related information. The micro service area determiner 424 in this example may determine, from the plurality of micro service areas, a micro service area associated with the UE 400 based on the at least one measurement.

In one example, performing the at least one measurement comprises: detecting a synchronization signal block (SSB) beam; and determining a beam index of the SSB. The micro service area determiner 424 may determine the micro service area based on the beam index. In another example, performing the at least one measurement comprises: measuring a reference signal received power (RSRP); and determining a range of the RSRP from a plurality of predetermined RSRP ranges. The micro service area determiner 424 may determine the micro service area based on the range of the RSRP.

In one embodiment, performing the at least one measurement comprises: performing a plurality of measurements with respect to a plurality of access control factors. The micro service area determiner 424 may determine the micro service area based on the plurality of access control factors. According to various embodiments, the plurality of access control factors are related to one or more of: a SSB beam detected by the UE; a range of a RSRP measured by the UE; a service type of the UE; a unified access control (UAC) type of the UE; a height information of the UE; a distance between the UE and BS s in neighbor cells; identifications of the neighboring cells; network slices; measurement results of other access control factors in at least one of the neighboring cells; and a physical location area of the UE determined by the UE based on a positioning strategy.

The micro cell based configurator 426 in this example can determine at least one of the following based on the micro service area associated with the UE: whether an access to the BS is allowed; a range of neighbor cells of the current cell to be measured; a timing advance (TA) value used by the UE; and a reference value of an uplink transmit power for the UE.

In one embodiment, the micro cell based configurator 426 may determine, based on the micro service areas related information, whether an access to the BS is allowed in the micro service area, wherein the micro service areas related information comprises access control information associated with each micro service area of the BS. The service connection establisher 428 in this example may establish a service connection to the BS when the access to the BS is allowed in the micro service area.

In one example, the micro cell based configurator 426 may determine, based on the micro service areas related information, whether an access to the BS is allowed or barred in the micro service area with respect to each of the plurality of access control factors. The service connection establisher 428 in this example may establish a service connection to the BS only when an access to the BS is allowed in the micro service area with respect to each of the plurality of access control factors.

In another example, the micro cell based configurator 426 may determine, based on the micro service areas related information, whether an access to the BS is allowed or barred in the micro service area with respect to any of the plurality of access control factors. The service connection establisher 428 in this example may establish a service connection to the BS when an access to the BS is allowed in the micro service area with respect to any of the plurality of access control factors.

In one embodiment, the micro cell based configurator 426 can determine, based on the micro service area associated with the UE, a timing advance (TA) for uplink synchronization of the UE according to a configuration. The configuration is determined based on a signal received from the BS, or based on historical TA values and movement track of the UE. The micro cell based configurator 426 may then determine an uplink transmission time based on the TA.

In another embodiment, the micro cell based configurator 426 can determine, based on the micro service area associated with the UE, a reference value of an uplink transmit power for the UE according to a configuration. The configuration is determined based on a signal received from the BS, or based on historical reference values of uplink transmit powers and movement track of the UE. The micro cell based configurator 426 may then determine an initial uplink transmit power of the UE based at least partially on the reference value.

After the service connection establisher 428 establishes a service connection to the BS, the UE may transmit uplink data to the BS based on the determined uplink transmission time and/or the determined initial uplink transmit power.

In one embodiment, the micro cell based configurator 426 can determine whether to perform a neighbor cell measurement based on the micro service area associated with the UE according to a configuration, wherein the configuration is determined based on a signal received from the BS or based on a moving history of the UE. For example, the micro cell based configurator 426 can determine a moving speed of the UE, and notify the neighbor cell measurer 429 about the moving speed. When the moving speed is lower than or equal to a predetermined threshold and the UE is in the center of the serving cell, no neighbor cell of the cell is measured. When the moving speed is higher than the predetermined threshold or the UE is at the edge of the serving cell, the neighbor cell measurer 429 may measure at least one neighbor cell of the cell. According to various embodiments, the moving speed of the UE may be determined based on one or more of: whether there is a change of the micro service area associated with the UE; and a changing speed of the micro service area associated with the UE.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the micro cell information analyzer 420. Conversely, each of the modules illustrated in FIG. 4 can be implemented using a plurality of separate components or elements.

Figure 5:
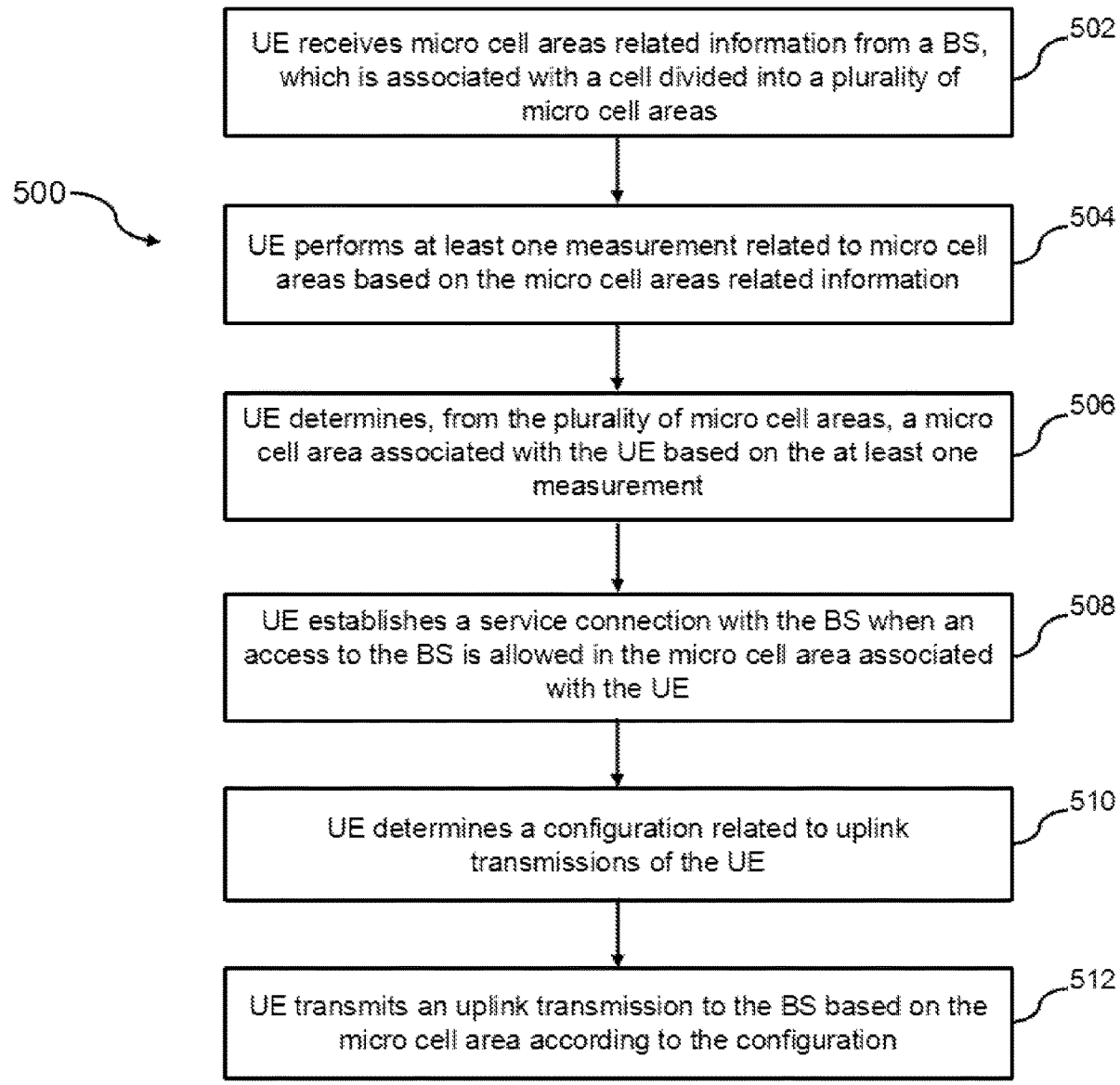
FIG. 5 illustrates a flow chart of a method performed by a UE for configuring micro service areas, in accordance with some embodiments of the present disclosure.

FIG. 5 illustrates a flow chart for a method 500 performed by a UE, e.g. the UE 400 in FIG. 4, for configuring micro service areas, in accordance with some embodiments of the present disclosure. At operation 502, the UE receives micro service areas related information from a BS, which is associated with a cell divided into a plurality of micro service areas. At operation 504, the UE performs at least one measurement related to micro service areas based on the micro service areas related information. At operation 506, the UE determines, from the plurality of micro service areas, a micro service area associated with the UE based on the at least one measurement. At operation 508, the UE establishes a service connection with the BS when an access to the BS is allowed in the micro service area associated with the UE. At operation 510, the UE determines a configuration related to uplink transmissions of the UE. At operation 512, the UE transmits an uplink transmission to the BS based on the micro service area according to the configuration. The order of the steps shown in FIG. 5 may be changed according to different embodiments of the present disclosure.

Different embodiments of the present disclosure will now be described in detail hereinafter. It is noted that the features of the embodiments and examples in the present disclosure may be combined with each other in any manner without conflict.

Figure 6:
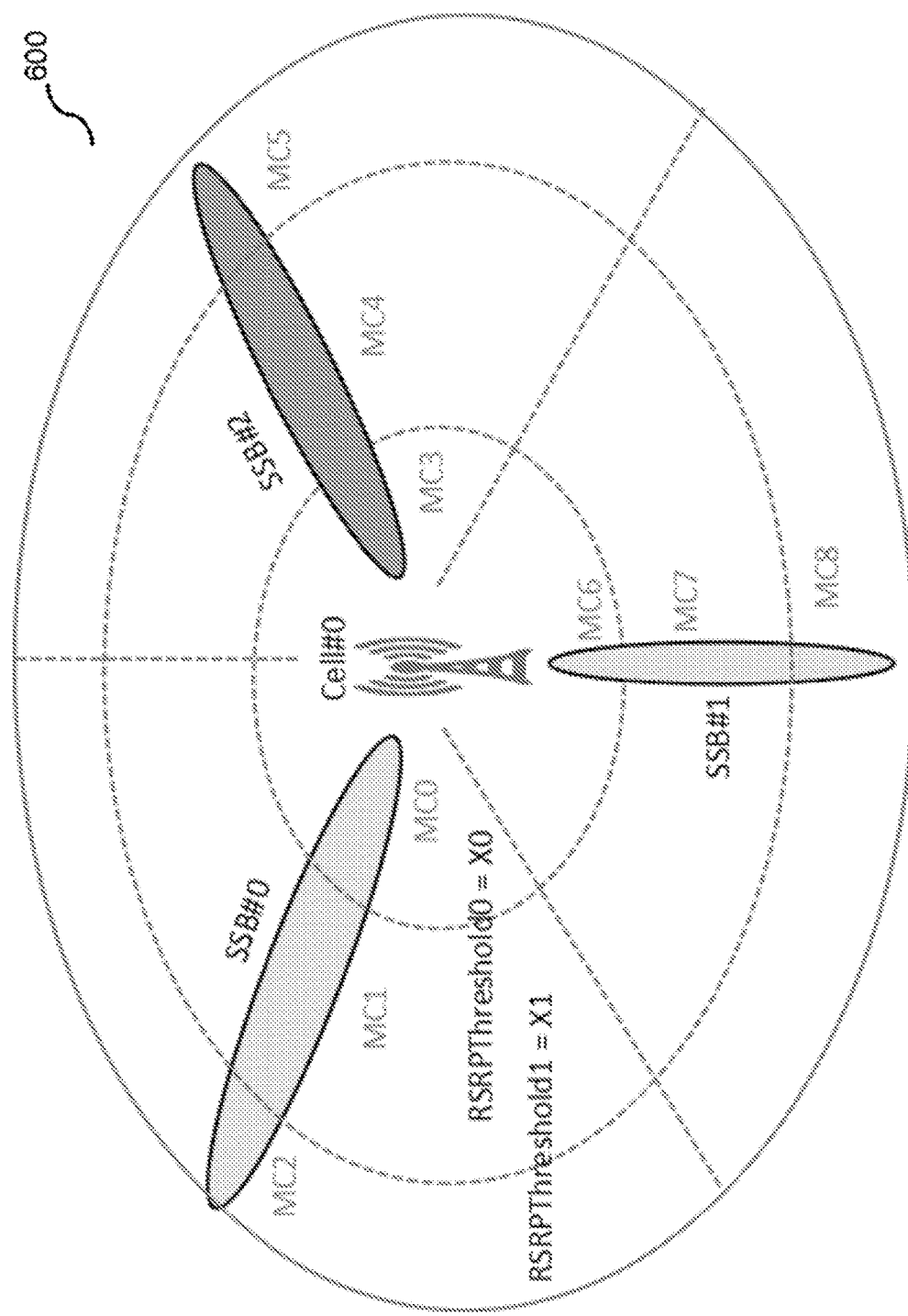
FIG. 6 illustrates an exemplary method for dividing a cell into several micro service areas based on a beam forming (BF) coverage area and a reference signal received power (RSRP) interval, in accordance with some embodiments of the present disclosure.

FIG. 6 illustrates an exemplary method 600 for dividing a cell into several micro service areas based on a beam forming (BF) coverage area and a reference signal received power (RSRP) range segment, in accordance with some embodiments of the present disclosure. As shown in FIG. 6, there are three SSB configurations, corresponding to three BF coverage areas respectively, in Cell #0. The three SSB configurations are marked SSB #0, SSB #1, SSB #2, based on which the Cell #0 can be divided into three micro service areas, respectively. Different SSB indexes correspond to different SSB beams.

In addition, there are two RSRP threshold configurations (RSRPThreshold0=X0; RSRPThreshold1=X1), which divide the RSRP range into three segments: (1) X0<=RSRP; (2) X1<=RSRP and RSRP<X0; (3) RSRP<X1. The Cell #0 can be divided into three micro service areas based on the three range segments, marked as RSRP_Range0, RSRP_Range1, RSRP_Range2, respectively.

As such, based on the three BF coverage areas and three RSRP range segments, Cell #0 is divided into 9 micro service areas, i.e. 9 micro cells, MC0, MC1 . . . MC8, as shown in FIG. 6 and as listed in table 700 in FIG. 7. According to various embodiments, the division of a cell into micro service areas may also be based on: a service type, a UAC category, a height information of the UE, a positioning strategy based on a plurality of neighbor cells, a distance between the UE and neighbor BSs, a distance between the UE and BSs in neighbor cells, identity of the neighboring cells; network slices; measurement results of radio quality in at least one of the neighboring cells; a physical location area of the UE determined based on a positioning strategy, in addition to the BF coverage area and RSRP segments.

According to various embodiments, the division result of the micro service areas of a cell can be used for an accurate access control strategy of the cell, an uplink synchronization strategy of the UE, an initial power determination strategy of the UE, a measurement relaxation strategy, etc.

Figure 8:
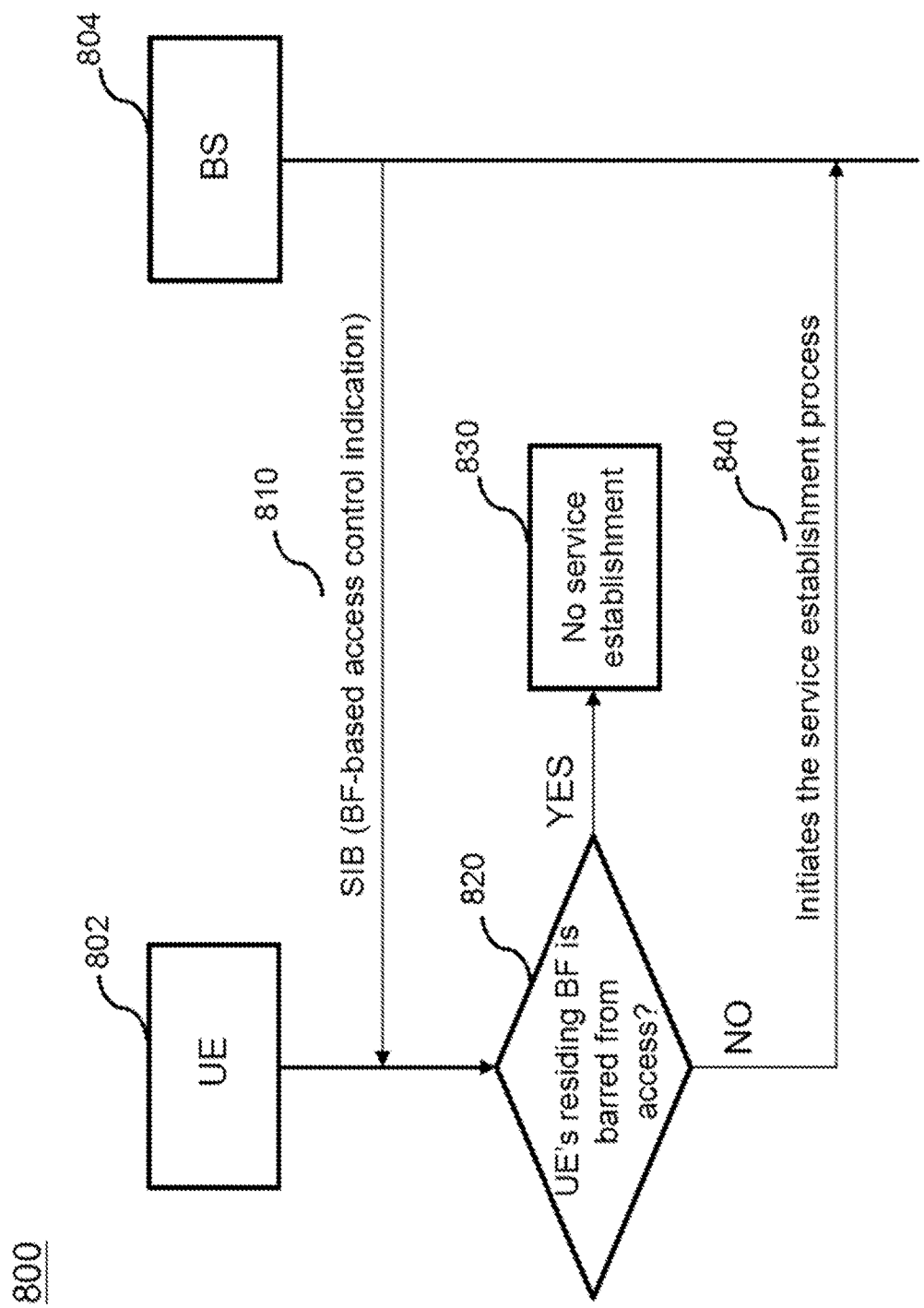
FIG. 8 illustrates an exemplary method for access control configuration based on a BF coverage area, in accordance with some embodiments of the present disclosure.

FIG. 8 illustrates an exemplary method 800 for access control configuration based on a BF coverage area, in accordance with some embodiments of the present disclosure. As shown in FIG. 8, at operation 810, the BS 804 only broadcasts a BF-based access control indication, e.g. via a SIB message, to the UE 802. Then at operation 820, to initiate a service establishment, the UE 802 makes a determination about: whether the BF where the UE resides is in a barred state. In this case, UE should check whether the BF is in barred state when initiating a service establishment.

If the residing BF of the UE 802 is in a Barred state, i.e. an access is barred and not allowed to the BS 804, the UE 802 does not initiate a service establishment process at operation 830. If the residing BF of the UE 802 is in a NotBarred state, i.e. an access is not barred and is allowed to the BS 804, the UE 802 initiates the service establishment process at operation 840.

Figure 9:
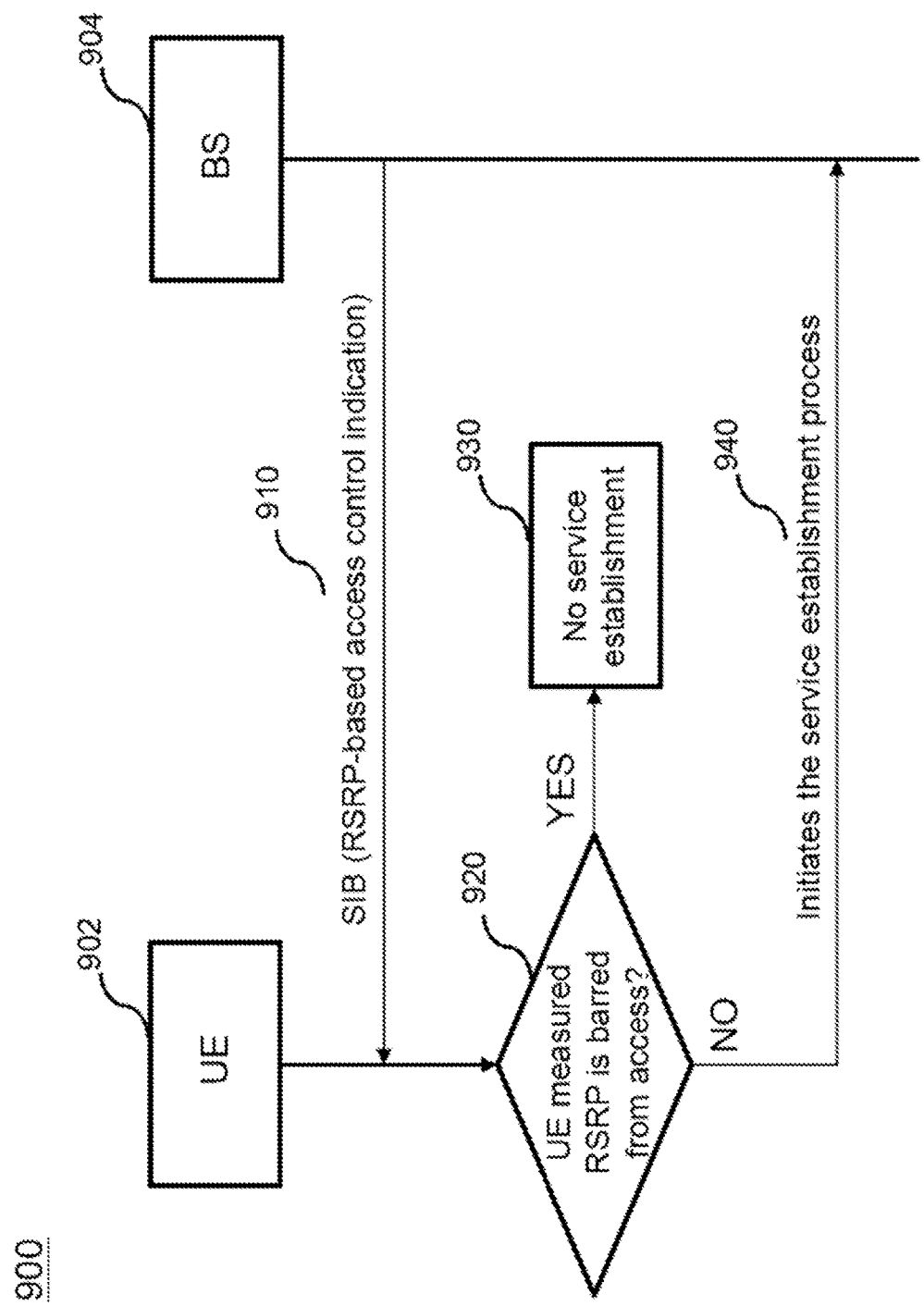
FIG. 9 illustrates an exemplary method for access control configuration based on a reference signal received power (RSRP) interval, in accordance with some embodiments of the present disclosure.

FIG. 9 illustrates an exemplary method 900 for access control configuration based on a reference signal received power (RSRP) segment, in accordance with some embodiments of the present disclosure. As shown in FIG. 9, at operation 910, the BS 904 only broadcasts an access control indication based on a RSRP segment, e.g. via a SIB message, to the UE 902. Then at operation 920, to initiate a service establishment, the UE 902 makes a determination about: whether the RSRP measured by the UE 902 is in the RSRP segment which is in a barred state, i.e. whether the range where the RSRP is located is in a Barred state. In this case, UE should check whether the RSRP measured by the UE is in the RSRP segment which is in barred state when initiating a service establishment.

If the RSRP segment where the measured RSRP is located is in the Barred state, i.e. an access is barred and not allowed to the BS 904, the UE 902 does not initiate a service establishment process at operation 930. If the RSRP segment where the measured RSRP is located is in the NotBarred state, i.e. an access is not barred and is allowed to the BS 904, the UE 902 initiates a service establishment process at operation 940.

Figure 10:
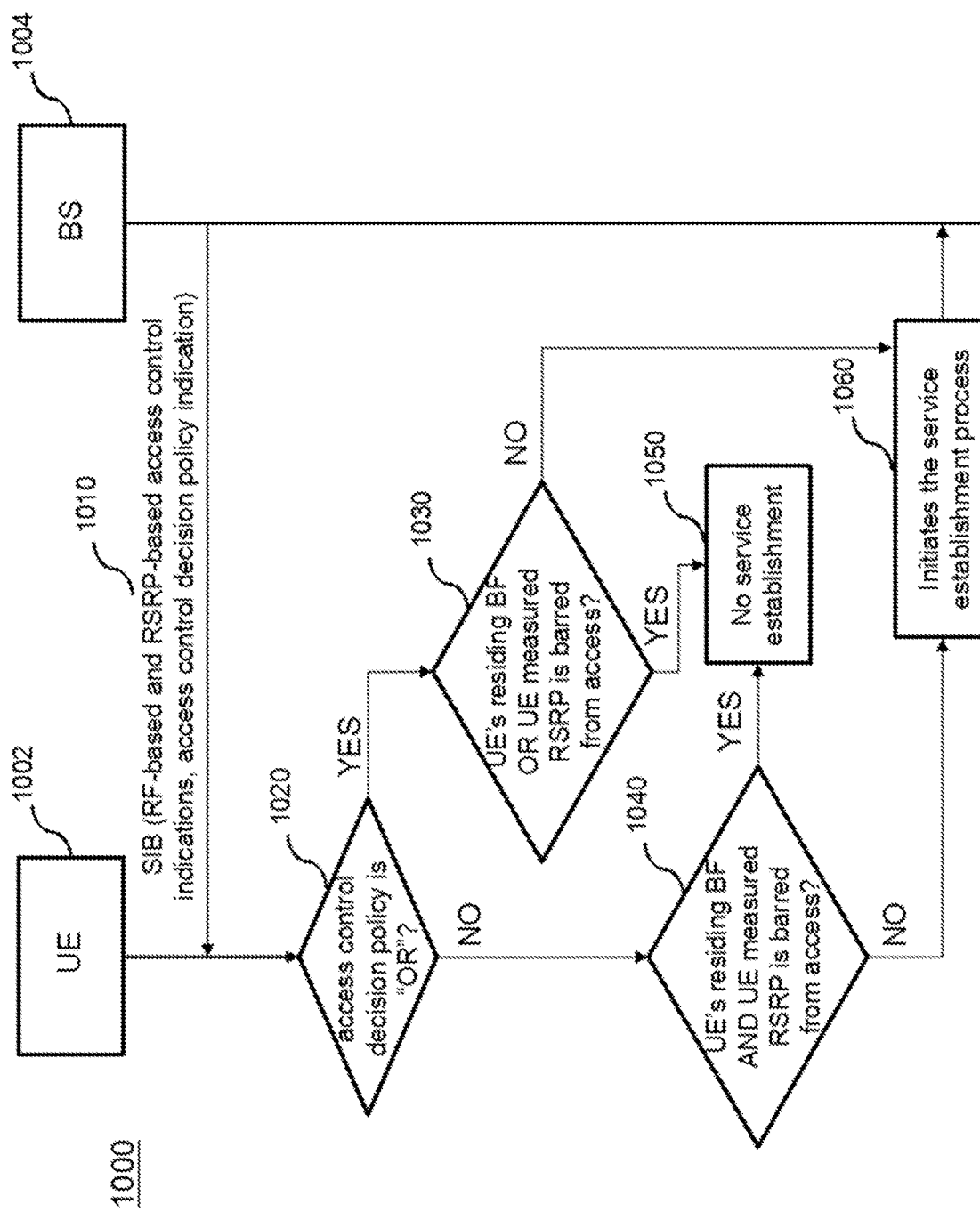
FIG. 10 illustrates an exemplary method for access control configuration based on a BF coverage area and a reference signal received power (RSRP) interval, in accordance with some embodiments of the present disclosure.

FIG. 10 illustrates an exemplary method 1000 for access control configuration based on a BF coverage area and a reference signal received power (RSRP) interval, in accordance with some embodiments of the present disclosure. As shown in FIG. 10, at operation 1010, the BS 1004 broadcasts both a BF-based access control indication and a RSRP interval based access control indication, e.g. via a SIB message, to the UE 1002. At the same time, the BS 1004 may also broadcast an access control decision policy indication at operation 1010.

Then at operation 1020, the UE 1002 checks whether the access control decision policy indicates "OR." If so, when any access control factor does not allow an access to the BS 1004, the access is not allowed. At operation 1030, to initiate a service establishment, the UE 1002 makes a determination about: whether there is an access control factor that does not allow the access, e.g. the RSRP measured by the UE 1002 is in a RSRP range segment corresponding to a Barred state, or the BF where the UE 1002 resides is in a Barred state. If any access control factor does not allow the access, the UE 1002 does not initiate a service establishment process at operation 1050. Otherwise, all access control factors allow the access, then the UE 1002 initiates a service establishment process at operation 1060.

If the UE 1002 determines that the access control decision policy is not "OR" at operation 1020. That is, the access control decision policy indicates "AND." Then only when all access control factors do not allow the access to the BS 1004, the access is not allowed. At operation 1040, to initiate a service establishment, the UE 1002 makes a determination about: whether all access control factors do not allow the access, e.g. the RSRP measured by the UE 1002 is in a RSRP range segment corresponding to a Barred state, and the BF where the UE 1002 resides is in a Barred state. If all access control factors do not allow the access, the UE 1002 does not initiate a service establishment process at operation 1050. Otherwise, at least one access control factor allows access, then the UE 1002 initiates a service establishment process at operation 1060.

In one embodiment, when a base station broadcasts both a BF-based access control indication and a RSRP range segment based access control indication, the base station does not need to broadcast the access control decision policy indication. In one example, the UE may make the access control decision according to an access control factor "OR" by default, as if there is access control decision policy indication indicating "OR." In another example, the UE may make the access control decision according to an access control factor "AND" by default, as if there is access control decision policy indication indicating "AND."

The BF-based access control indication and/or the RSRP range based-based access control indication, and the access control decision policy may also be applicable to or in combination with other access control factors such as UAC and service types. For example, the base station can also configure a UAC-based access control policy, based on a pre-definition of UAC's access categories. Then the base station can configure decision policy indications ("OR" or "AND") for different access control factors. Based on the indications, the UE make decisions on multiple access control factors.

In another embodiment, the base station does not broadcast access control decision policy indications. In one example, the UE by default makes access control decisions based on the access control factor "OR." In another example, the UE by default makes access control decisions based on the access control factor "AND."

Figure 11:
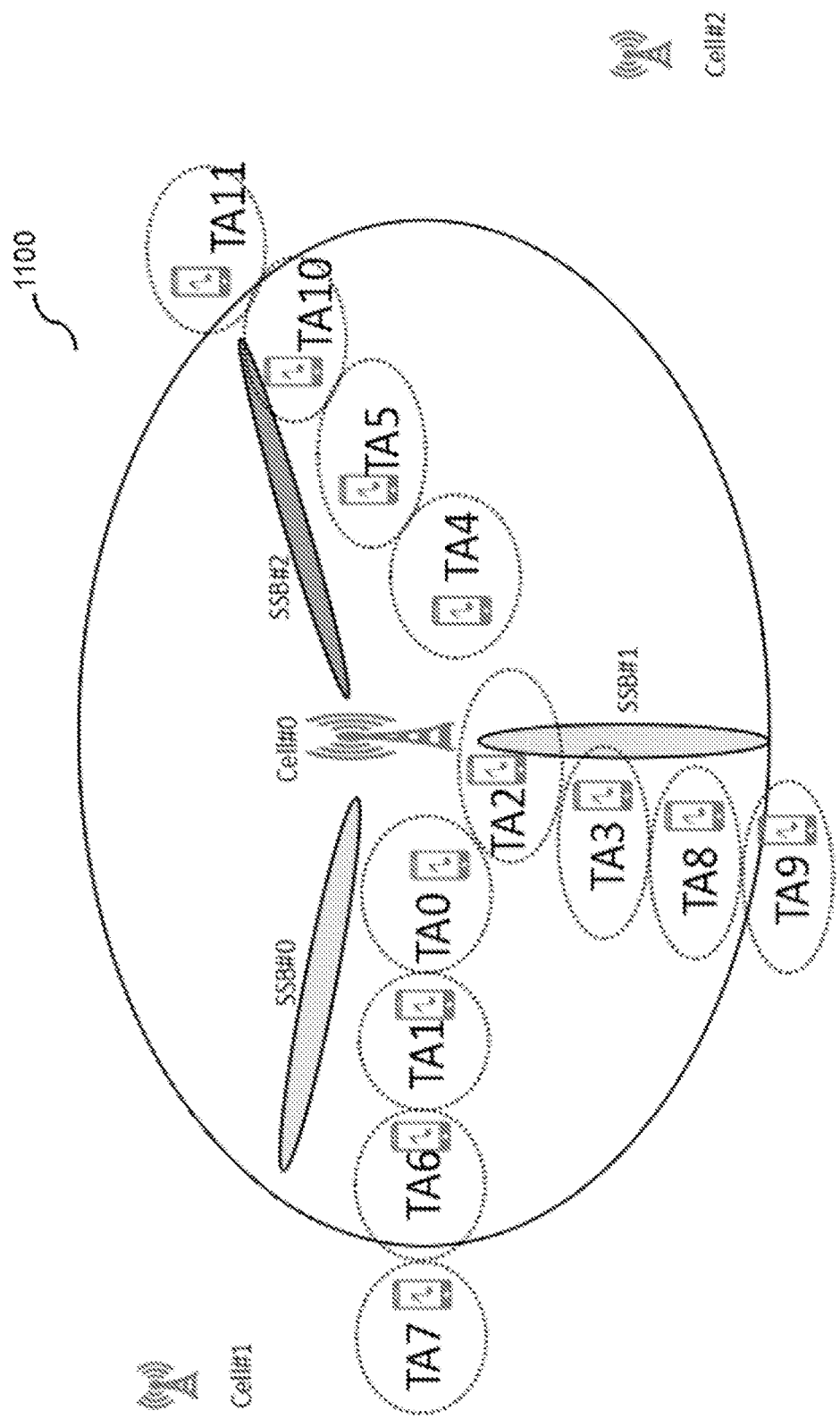
FIG. 11 illustrates an exemplary method for uplink synchronization based on micro service areas, in accordance with some embodiments of the present disclosure.

FIG. 11 illustrates an exemplary method 1100 for uplink synchronization based on micro service areas, in accordance with some embodiments of the present disclosure. In the example shown in FIG. 11, the area covered by Cell #0 is divided into several areas based on the method described in FIG. 6. Based on each area, a UE can uniquely determine an uplink synchronization timing advance (TA) value, as shown in the table 1200 in FIG. 12. A location of each UE can be used to uniquely determine a TA value based on a predefined area covering the location. When the UE initiates a service, the TA value may be directly used to determine an uplink transmission time, thereby achieving uplink synchronization. For a stationary UE, a user in a micro service area may use paging parameters or TAC characteristics of the micro service area for paging monitoring. The paging parameters include at least the number of PDCCH repetitions.

Figure 13:
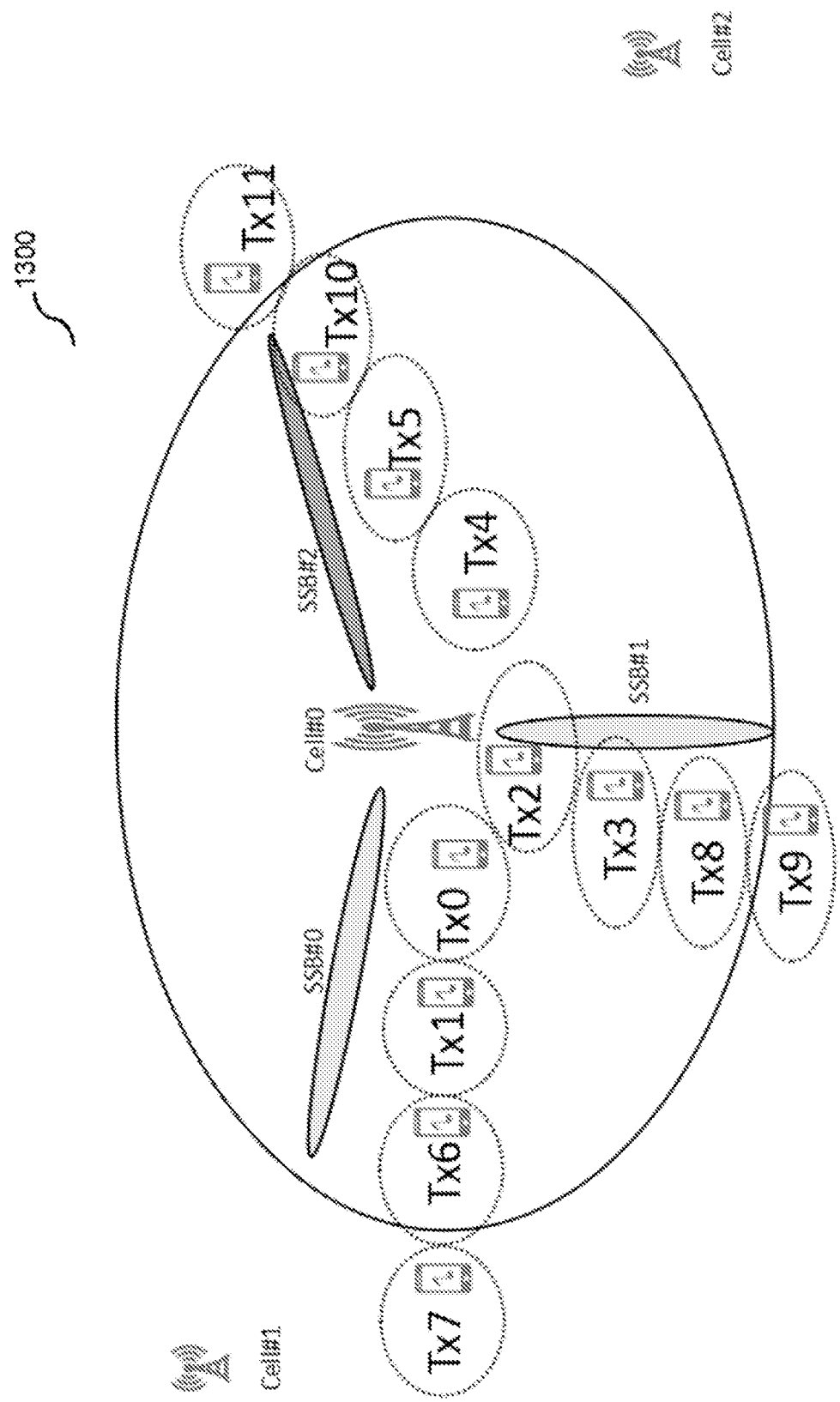
FIG. 13 illustrates an exemplary method for determining an uplink initial transmit power based on micro service areas, in accordance with some embodiments of the present disclosure.

FIG. 13 illustrates an exemplary method 1300 for determining an uplink initial transmit power and/or measurement relaxation based on micro service areas, in accordance with some embodiments of the present disclosure. In the example shown in FIG. 13, the area covered by Cell #0 is divided into several areas based on the method described in FIG. 6. Based on each area, a UE can uniquely determine an uplink initial transmit power reference value, referred to as transmit power (Tx), as shown in the table 1400 in FIG. 14. A location of each UE can be used to uniquely determine a Tx reference value based on a predefined area covering the location. When the UE initiates a service, the UE may directly use the Tx reference value to determine the uplink initial transmit power. In another example, when the UE initiates a service, the UE may determine the uplink initial transmit power based on a combination of factors, such as the Tx reference value and a transport block size (TBS) to be transmitted. For a stationary UE, a user in a micro service area may use paging parameters or TAC characteristics of the micro service area for paging monitoring. The paging parameters include at least the number of PDCCH repetitions.

In addition, in the example shown in FIG. 13 and FIG. 14, for the cell center areas (e.g. Tx0, Tx2, Tx4), it is almost impossible for a UE to perform cell reselection. As such, the UE in these micro service areas may not perform neighbor cell measurements and may perform slow measurement with respect to the serving cell, e.g. performing a periodic measurement with respect to the serving cell with a large time period. For micro service areas closer to the cell center (e.g. Tx1, Tx3, Tx5), a UE may have a cell reselection but with a low probability. The UE in these micro service areas may measure only a portion of the neighboring cells. For micro service areas farther away from the cell center (e.g. Tx6, Tx7, Tx8, Tx9, Tx10, Tx11), a UE may have a cell reselection with a high probability. The UE in these micro service areas may measure all possible neighboring cells.

In the examples shown in FIGS. 11-14, the base station may configure information related to the micro service areas, a corresponding relationship between micro service areas and uplink synchronization TA values, and/or a corresponding relationship between micro service areas and the UE's uplink initial transmit power reference values. The base station may also determine parameters related to the micro service areas and the uplink synchronization TA, e.g. a mapping relationship between RSRP and TA in a BF region. The base station may also determine parameters related to the micro service areas and the reference values of the uplink transmit power of the UE, e.g. a mapping relationship between RSRP range segment and Tx in a BF region. Based on the micro service areas, the base station may configure a list of neighbor cells, set a threshold for cell reselection, select a cell handover strategy, and generate measurement strategy indications, e.g. whether to measure neighbor cells, whether to measure a portion of neighbor cells, whether to measure all neighbor cells, etc. Based on these configurations, the UE can determine the uplink synchronization TA value, its uplink initial transmit power reference value, a measurement strategy of the micro service area, the neighbor cell list, a cell reselection strategy, and/or a cell handover strategy.

In one embodiment, the above mentioned configurations can be configured through a SIB broadcast, especially when the configurations are applicable to all UEs in the micro service area. In another embodiment, the above mentioned configurations can be configured for specific UEs through UE-specific signaling. For example, for stationary or static UEs at the center of the serving cell, neighbor cell measurement is not performed at Tx0, Tx1, Tx2, Tx3, Tx4, Tx5, Tx6, Tx7, Tx8; for fast moving UEs or at the edge of the serving cell, neighbor cell measurement is always performed in Cell #0.

In one embodiment, whether a UE is stationary or moving at a high speed may be determined based on whether the micro service area where the UE is located changes and a speed of this change, i.e. whether the Tx value or the TA value changes and a speed of the change. In the examples shown in FIGS. 11-14, the UE may also adaptively determine the uplink synchronization TA value, the UE's uplink initial transmit power reference value, and the micro service area measurement strategy, based on its own moving path or motion trajectory and historical TA and Tx values.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method performed by a wireless communication device, the method comprising:
   receiving, from a wireless communication node, micro service areas related information related to a plurality of micro service areas of a cell; and
   determining, from the plurality of micro service areas, a micro service area associated with the wireless communication device, provided by the wireless communication node based on at least one of: a reference signal received power (RSRP) measurement value, a beamforming (BF) coverage area or a synchronization signal block (SSB) beam index, a neighbor cell,
   wherein a paging strategy for the wireless communication device is determined based on the micro service area associated with the wireless communication device according to a configuration, and
   wherein the paging strategy includes at least one of: paging beams for the wireless communication device or a paging area range.

2. The method of claim 1, comprising:
   determining, based on the micro service area associated with the wireless communication device, at least one of:
      whether an access to the wireless communication node is allowed;
      a range of neighbor cells to be measured;
      a timing advance (TA) value used by the wireless communication device;
      a reference value of an uplink transmit power for the wireless communication device; or
      a paging strategy for a stationary wireless communication device.

3. The method of claim 1, comprising:
   performing at least one measurement related to micro service areas based on the micro service areas related information, wherein the micro service area associated with the wireless communication device is determined based on the at least one measurement, wherein performing the at least one measurement comprises:

detecting a synchronization signal block (SSB); and
determining a beam index of the SSB, wherein the micro service area is determined based on the beam index, or measuring a reference signal received power (RSRP); and determining a range of the RSRP from a plurality of predetermined RSRP ranges, wherein the micro service area is determined based on the range of the RSRP.

4. The method of claim 1, comprising:
determining, based on the micro service areas related information, whether an access to the wireless communication node is allowed in the micro service area, wherein the micro service areas related information comprises access control information associated with each micro service area of the wireless communication node;
establishing a service connection to the wireless communication node when the access to the wireless communication node is allowed in the micro service area; and
performing a plurality of measurements with respect to a plurality of access control factors, wherein the micro service area is determined based on the plurality of access control factors.

5. The method of claim 1, wherein the micro service areas related information is related to one or more of:
a SSB beam detected by the wireless communication device;
a RSRP range covering a RSRP measured by the wireless communication device;
a service type of the wireless communication device;
a unified access control (UAC) type of the wireless communication device;
a height information of the wireless communication device;
a distance between the wireless communication device and wireless communication nodes in neighbor cells;
identity of the neighboring cells;
network slices;
measurement results of other access control factors in at least one of the neighboring cells; and
a physical location area of the wireless communication device determined by the wireless communication device based on a positioning strategy.

6. The method of claim 4, comprising:
determining, based on the micro service areas related information, whether an access to the wireless communication node is allowed or barred in the micro service area with respect to each of the plurality of access control factors; and establishing a service connection to the wireless communication node only when the access to the wireless communication node is allowed in the micro service area with respect to each of the plurality of access control factors, or
determining, based on the micro service areas related information, whether an access to the wireless communication node is allowed or barred in the micro service area with respect to any of the plurality of access control factors; and establishing a service connection to the wireless communication node when the access to the wireless communication node is allowed in the micro service area with respect to any of the plurality of access control factors.

7. The method of claim 1, comprising:
determining, based on the micro service area associated with the wireless communication device, a timing advance (TA) for uplink synchronization of the wireless communication device according to a configuration, wherein the configuration is determined based on a signal from the wireless communication node or based on historical TA values and a movement path of the wireless communication device; and
determining an uplink transmission time based on the TA.

8. The method of claim 1, comprising:
determining, based on the micro service area associated with the wireless communication device, a reference value of an uplink transmit power for the wireless communication device according to a configuration, wherein the configuration is determined based on a signal from the wireless communication node or based on historical reference values of uplink transmit powers and a movement path of the wireless communication device; and
determining an initial uplink transmit power of the wireless communication device based at least partially on the reference value.

9. The method of claim 1, comprising:
determining whether to perform a neighbor cell measurement based on the micro service area associated with the wireless communication device according to a configuration, wherein the configuration is determined based on a signaling from the wireless communication node or based on a moving history of the wireless communication device,
further comprising: determining a moving speed of the wireless communication device; not measuring neighbor cell of the cell when the moving speed is lower than or equal to a predetermined threshold; and measuring at least one neighbor cell of the cell when the moving speed is higher than the predetermined threshold,
wherein the moving speed of the wireless communication device is determined based on one or more of:
whether there is a change of the micro service area associated with the wireless communication device; and
a changing speed of the micro service area associated with the wireless communication device.

10. The method of claim 1, wherein the wireless communication device is geostationary, the paging strategy includes a repetition number of Physical Downlink Control Channel (PDCCH) for paging, and the paging strategy is determined based on a signal from the wireless communication node or based on historical paging strategy and a movement path of the wireless communication device; and
wherein the method further comprises: receiving the paging based on the paging strategy for the wireless communication device.

11. A method performed by a wireless communication node, the method comprising:
transmitting micro service areas related information to a wireless communication device, and
determining, based on the micro service area associated with the wireless communication device, a paging strategy for the wireless communication device according to a configuration, wherein the micro service areas are divided from a cell provided by the wireless communication node based on at least one of: a reference signal received power (RSRP) measurement value, a beamforming (BF) coverage area or a synchronization signal block (SSB) beam index, a neighbor cell identity (ID), a unified access control (UAC) category, an access class and, wherein the paging strategy includes at least one of: paging beams for the wireless communication device or a paging area range, wherein:
the wireless communication node is associated with a cell covering a plurality of micro service areas, and
a micro service area associated with the wireless communication device is determined from the plurality of micro service areas.

12. The method of claim 11, wherein, based on the micro service area associated with the wireless communication device, at least one of the following is determined:
whether an access to the wireless communication node is allowed;
a range of neighbor cells to be measured;
a timing advance (TA) value used by the wireless communication device;
a reference value of an uplink transmit power for the wireless communication device; or
a paging strategy for a stationary wireless communication device.

13. The method of claim 11, wherein the micro service areas related information is utilized by the wireless communication device to perform at least one measurement related to micro service areas, and the micro service area associated with the wireless communication device is determined based on the at least one measurement, and
wherein the at least one measurement is performed by:
detecting a synchronization signal block (SSB); and determining a beam index of the SSB, wherein the micro service area is determined based on the beam index, or
measuring a reference signal received power (RSRP); and determining a range of the RSRP from a plurality of predetermined RSRP ranges, wherein the micro service area is determined based on the range of the RSRP.

14. The method of claim 11, comprising:
establishing a service connection with the wireless communication device when an access to the wireless communication node is allowed in the micro service area,
wherein whether the access to the wireless communication node is allowed in the micro service area is determined based on the micro service areas related information,
the micro service areas related information comprises access control information associated with each micro service area of the wireless communication node,
the micro service areas related information is utilized by the wireless communication device to perform a plurality of measurements with respect to a plurality of access control factors, and
the micro service area associated with the wireless communication device is determined based on the plurality of access control factors.

15. The method of claim 11, wherein the micro service areas related information is related to one or more of:
a SSB beam detected by the wireless communication device;
a RSRP range covering a RSRP measured by the wireless communication device;
a service type of the wireless communication device;
a unified access control (UAC) type of the wireless communication device;
a height information of the wireless communication device;
a distance between the wireless communication device and wireless communication nodes in neighbor cells;
identifications of the neighboring cells;
network slices;
measurement results of other access control factors in at least one of the neighboring cells; and
a physical location area of the wireless communication device determined by the wireless communication device based on a positioning strategy.

16. The method of claim 14, comprising:
establishing a service connection with the wireless communication device only when an access to the wireless communication node is allowed in the micro service area with respect to each of the plurality of access control factors,
wherein whether the access to the wireless communication node is allowed or barred in the micro service area with respect to each of the plurality of access control factors is determined based on the micro service areas related information.

17. The method of claim 14, comprising:
establishing a service connection with the wireless communication device when an access to the wireless communication node is allowed in the micro service area with respect to any of the plurality of access control factors,
wherein whether the access to the wireless communication node is allowed or barred in the micro service area with respect to any of the plurality of access control factors is determined based on the micro service areas related information.

18. The method of claim 11, comprising:
transmitting a TA related configuration based on the micro service area associated with the wireless communication device, or
transmitting an uplink transmit power reference value related configuration based on the micro service area associated with the wireless communication device.

19. The method of claim 11, comprising:
determining, based on the micro service area associated with the wireless communication device, a paging strategy for the wireless communication device according to a configuration, wherein the wireless communication device is geostationary, the paging strategy includes at least one of:
a repetition number of Physical Downlink Control Channel (PDCCH) for paging,
paging beams for the wireless communication device, and
a paging area range, and
wherein the paging strategy is determined based on a signal from the wireless communication node or based on historical paging strategy and a movement path of the wireless communication device; and
sending the paging based on the paging strategy for the wireless communication device.

20. A wireless communication device configured to:
receive, from a wireless communication node, micro service areas related information related to a plurality of micro service areas of a cell; and
determine, from the plurality of micro service areas, a micro service area associated with the wireless communication device, provided by the wireless communication node based on at least one of: a reference signal received power (RSRP) measurement value, a beamforming (BF) coverage area or a synchronization signal block (SSB) beam index, a neighbor cell,
wherein a paging strategy for the wireless communication device is determined based on the micro service area associated with the wireless communication device according to a configuration, and wherein the paging strategy includes at least one of: paging beams for the wireless communication device or a paging area range.

* * * * *